US011969072B2

(12) United States Patent
Hedaoo

(10) Patent No.: US 11,969,072 B2

(45) Date of Patent: Apr. 30, 2024

(54) HANDHELD DEVICE AND A METHOD FOR CREATING CUSTOMISED COLOURS INSTANTLY

(71) Applicant: Mugdha Prabhakar Hedaoo, Singapore (SG)

(72) Inventor: Mugdha Prabhakar Hedaoo, Singapore (SG)

( * ) Notice: Subject to any disclaimer, the term of this patent is extended or adjusted under 35 U.S.C. 154(b) by 578 days.

(21) Appl. No.: 17/250,464

(22) PCT Filed: Sep. 2, 2019

(86) PCT No.: PCT/SG2019/050437

§ 371 (c)(1),
(2) Date: Mar. 3, 2021

(87) PCT Pub. No.: WO2020/050775

PCT Pub. Date: Mar. 12, 2020

(65) Prior Publication Data

US 2021/0282537 A1 Sep. 16, 2021

(30) Foreign Application Priority Data

Sep. 3, 2018 (SG) ........................... 10201807527T

(51) Int. Cl.

*A45D 40/24* (2006.01)
*A45D 34/06* (2006.01)
(Continued)

(52) U.S. Cl.

CPC ............. *A45D 40/24* (2013.01); *A45D 34/06* (2013.01); *A45D 44/005* (2013.01); (Continued)

(58) Field of Classification Search

CPC ...... A45D 40/24; A45D 34/06; A45D 44/005; A45D 2200/053; A45D 2200/058; (Continued)

(56) References Cited

U.S. PATENT DOCUMENTS 4,838,457 A * 6/1989 Swahl ................ B65D 83/0055 222/548

6,655,551 B2 * 12/2003 Manne ................ B01F 35/7174 222/137

(Continued)

FOREIGN PATENT DOCUMENTS

FR 2910252 A1 * 6/2008 ............. A45D 33/08

*Primary Examiner* — Vishal Pancholi

(57) ABSTRACT

The present invention discloses a handheld device 200 and a method for creating customised cosmetic colours instantly. The handheld device 200 comprises a holder body 202 with two or more slots to house two or more dispensers that dispense two or more base colour liquid lipsticks. The handheld device 200 further comprises a container 212. In order to create customised liquid lipsticks, a user follows a colour recipe chart 600 and dispenses the two or more base colours in the two or more dispensers in predetermined ratios to create a custom colour in the container 212. While the present description focuses on creating liquid lipsticks, it will be apparent to those with ordinary skill in the art that the handheld device 200 and the method can be used to create any other colour cosmetics or artists colours.

17 Claims, 7 Drawing Sheets

(51) Int. Cl.

| | |
|---|---|
| ***A45D 44/00*** | (2006.01) |
| ***B01F 33/501*** | (2022.01) |
| ***B01F 33/841*** | (2022.01) |
| ***B01F 35/88*** | (2022.01) |
| *B01F 101/21* | (2022.01) |

(52) U.S. Cl.
CPC ...... *B01F 33/50111* (2022.01); *B01F 33/841* (2022.01); *B01F 35/8822* (2022.01); *A45D 2200/053* (2013.01); *A45D 2200/058* (2013.01); *B01F 2101/21* (2022.01)

(58) Field of Classification Search
CPC .............. B01F 33/50111; B01F 33/841; B01F 35/8822; B01F 2101/21
See application file for complete search history.

(56) References Cited

U.S. PATENT DOCUMENTS

| | | | | |
|---|---|---|---|---|
| 7,222,752 | B2 * | 5/2007 | Ponton | B05B 11/1084 222/137 |
| 8,596,498 | B2 * | 12/2013 | Werner | B05B 11/1083 222/145.5 |
| 2004/0164096 | A1 * | 8/2004 | Engel | B01F 33/84 222/137 |
| 2005/0184091 | A1 * | 8/2005 | Abergel | B65D 81/3288 222/145.5 |
| 2016/0175620 | A1 * | 6/2016 | Landa | A61K 8/40 8/408 |
| 2018/0027950 | A1 * | 2/2018 | Choi | G01F 13/00 |

* cited by examiner 601 602 603 604 605

606

| | Red | Blue | Yellow | Black | White |
|---|---|---|---|---|---|
| | 1 | 1 | | | |
| | 1 | | | 1 | |
| | 1 | 1 | 1 | | |
| | 2 | 1 | | | |
| | 4 | 1 | | | |
| | 6 | 2 | 1 | | |
| | 4 | | 1 | 4 | |

600

FIG. 6

HANDHELD DEVICE AND A METHOD FOR CREATING CUSTOMISED COLOURS INSTANTLY

FIELD OF THE INVENTION

The present invention relates to creating a plurality of customised colours using two or more base colours. More specifically, the present invention relates to a handheld device and a method that enables users to create their own custom colour liquid lipsticks instantly anywhere.

BACKGROUND ART

The global cosmetics market is growing at the rate of about 4% every year. Colour cosmetics (or makeup) segment is one of the largest contributors towards this growth. Colour cosmetics has recently joined other lifestyle segments such as clothing, perfumery etc. in the popular trends towards customisation and personalisation.

One of the first segments in colour cosmetics industry to embrace customisation was liquid foundations. Services wherein consultants mix the perfect shade for a user in-store or via an order placed online is know in the art. Similarly, customisation of lip colours in-store or online is know in the art. A big tabletop printer for 'printing' custom lip colours is also known in the art.

While these existing products or services appease the consumer's need for customised products, those skilled in the art will realise that they either have a long wait time or the devices are very bulky to travel with. Also, consumers only receive a couple of customised colours at a time making it difficult to use repeatedly.

Today's consumers are impatient and actively seek to get more value for their money. Moreover, consumers are becoming more eco-conscious and have shown a preference for smaller product quantities and resuable packaging to reduce product and packaging wastage.

There are no known products in the art that enable a user to instantly create their own colours (for lipstick, eye colours, foundations etc.) in the comfort of their homes or while travelling.

Keeping in mind this pressing need of the market for instant gratification and sustainability, the present invention discloses a handheld device and a method thereof to enable consumers to create their own customised colour cosmetics instantly.

BRIEF SUMMARY OF THE INVENTION

The present invention discloses a handheld device and a method to enable a user to create their own customised colours instantly anywhere. The proposed application of the handheld device is for liquid lipsticks, however, variations of the present invention to create any cosmetics or liquid colour of semi solid/solid or liquid consistency are foreseen and are within the scope of the present invention.

The handheld device comprises of a holder body with two or more slots to house two or more dispensers, wherein each dispenser contains a liquid lipstick of a specific base colour. The base colours can primary colours from any colour system such as RYB (Red, Yellow, Blue, White, Black), CMYK (Cyan, Magenta, Yellow, Key), RGB (Red, Green, Blue, White, Black) etc.

To create a specific custom colour, a user refers to a colour recipe chart and pumps each of the dispensers the number of times mentioned in the colour recipe chart. When the user pumps each dispenser, the liquid lipstick inside the dispensers falls into a container attached to the holder body. The user then detaches the container and manually mixes all of the dispensed liquid lipstick with a wand to create their desired custom colour.

The user can create any number of different colour liquid lipsticks in accordance with the present invention and also store created liquid lipsticks for later use.

BRIEF DESCRIPTION OF THE DRAWINGS

The various aspects, features, and advantages of the present invention will become more apparent in light of the following detailed description of the preferred embodiment when taken in conjunction with the accompanying drawings in which:

FIG. 6 depicts a colour recipe chart 600 in accordance with an embodiment of the present invention.

DETAILED DESCRIPTION

Figure 1:
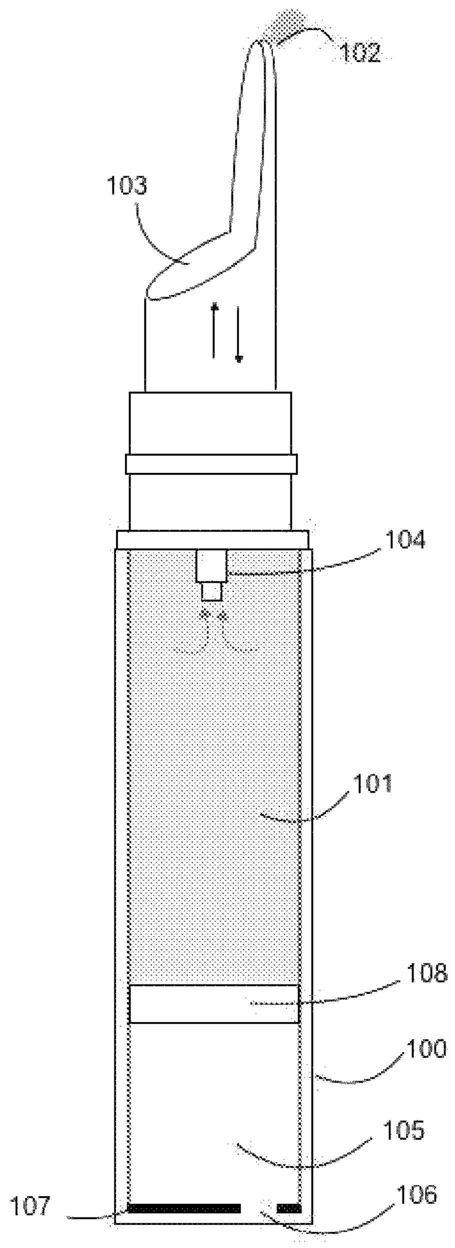
FIG. 1 (Prior Art)
FIG. 1 illustrates a dispenser 100 known in the art for dispensing viscous liquids.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One with ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Spatially relative terms, such as "beneath," "below," "lower," "above," "upper," and the like may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

The present invention will now be described by referencing the appended figures representing preferred embodiments.

FIG. 1 depicts a dispenser 100 for liquids and is already known in the art. The dispenser 100 is used as a colour cartridge of a base colour in the present invention. The term 'cartridge' and 'dispenser' may be used interchangably for the purposes of this description.

In the preferred embodiment of the present invention, the dispenser 100 is airless, however, those skilled in the art will appreciate that some embodiments of the present invention may entail the use of dispensers with regular pump mechanism without compromising on the functionality or the results.

The dispenser 100 is conventionally know in the art for dispensing viscous liquids such as serums or creams. However, in accordance with various embodiments of the present invention, the dispenser 100 is used to dispense a base colour 101. The base colour 101 can be, but is not limited to, a liquid lipstick of a primary colour of a colour system such as RYB, CMYK, RGB etc. or an additive to transform the finish of the liquid lipsticks. For instance, the base colour 101 can be a white colour, a black colour, a blue colour, a red colour, a yellow colour, a mattifier agent, a shine agent or a sparkle agent.

The dispenser 100 dispenses a predetermined amount of the base colour 101 through a hole 102 in a nozzle 103 when the nozzle 103 is pressed down. With each push of the nozzle 103, the predetermined amount of the base colour 101 enters an inlet 104 of the nozzle 103, and consequently, air enters an empty area 105 through a hole 106 in a bottom lid 107 of the dispenser 100 to replace the dispensed liquid lipstick and a movable plate 108 moves the base colour 101 upwards by a proportional amount.

In accordance with the present invention, two or more of the dispenser 100 are used as cartridges to dispense two or more base colours of liquid lipstick into a container. Various custom colours or textures are achieved when the two or more base colours are dispensed in different ratios and mixed homogeneously.

Figure 2:
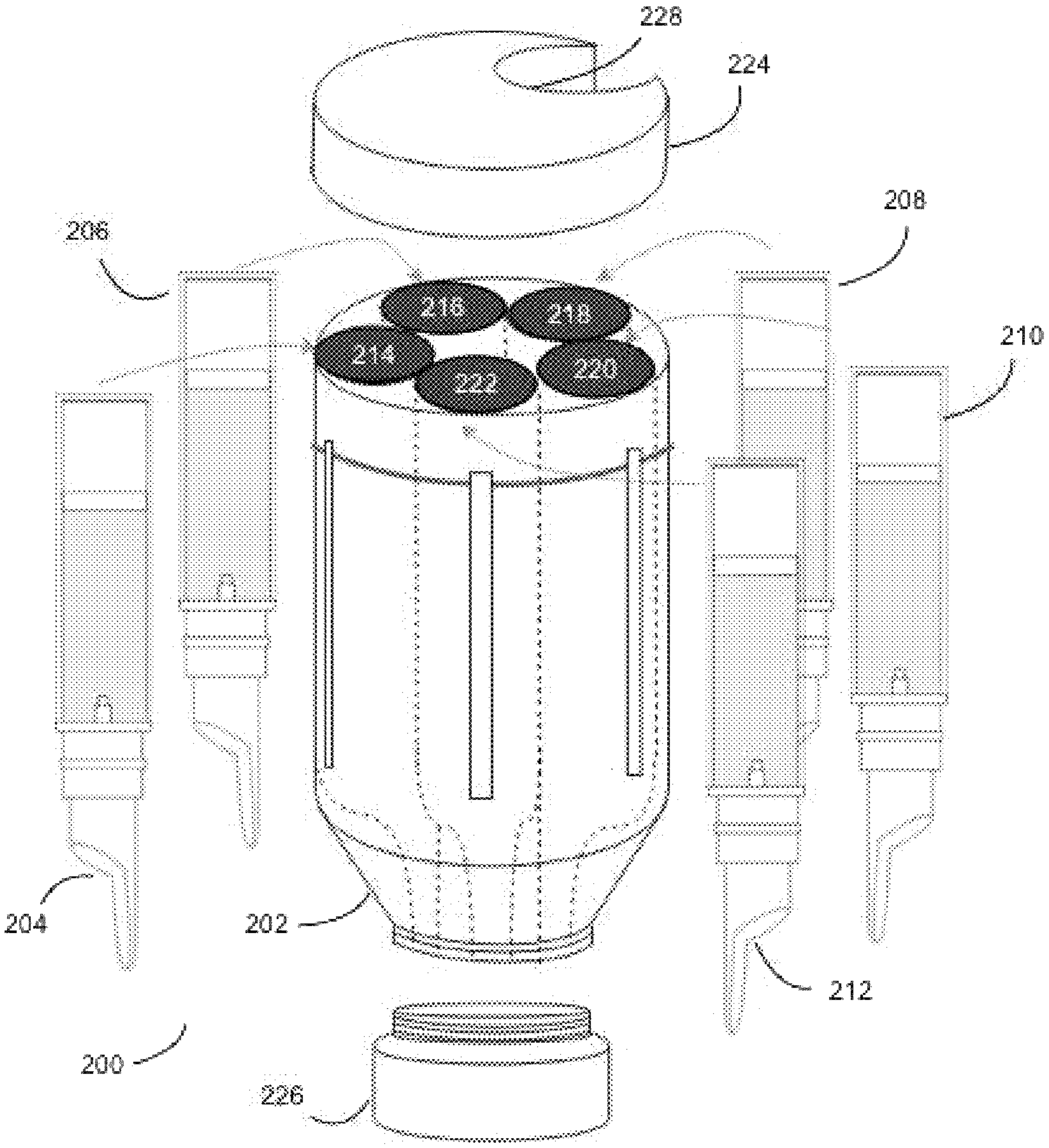
FIG. 2 illustrates a handheld device 200 for creating a plurality of customised colours in accordance with various embodiments of the present invention.

FIG. 2 illustrates a handheld device 200 in accordance with an embodiment of the present invention. The handheld device 200 comprises of a holder body 202 designed to house five dispensers—a first dispenser 204, a second dispenser 206, a third dispenser 208, a fourth dispenser 210 and a fifth dispenser 212. Each dispenser dispenses a different base colour of liquid lipstick. For example, the first dispenser 204 may dispense a white colour liquid lipstick, the second dispenser 206 may dispense a black colour liquid lipstick, the third dispenser 208 may dispense a red colour liquid lipstick, the fourth dispenser 210 may dispense a blue colour liquid lipstick and the fifth dispenser 212 may dispense a yellow colour liquid lipstick. This colour scheme of red, blue and yellow is known in the art as the RYB colour scheme. White and black colours are used to change the hue and the tone of the colours respectively.

The holder body 202 comprises two or more slots to house the two or more dispensers. In accordance with FIG. 2, the holder body 202 comprises a first slot 214 to house the first dispenser 204, a second slot 216 to house the second dispenser 206, a third slot 218 to house the third dispenser 208, a fourth slot 220 to house the fourth dispenser 210 and a fifth slot 222 to house the fifth dispenser 212. The slots are moulded such that the dispensers fit snugly into the holder body 202 with minimum wobble or relative movement.

The handheld device 200 with the first dispenser 204, the second dispenser 206, the third dispenser 208, the fourth dispenser 210 and the fifth dispenser 212 inserted inside the holder body 202 is shown in conjunction with FIG. 3 below.

In accordance with an embodiment of the present invention, the handheld device 200 further comprises a top lid 224 and a container 226.

In accordance with the present embodiment, the top lid 224 comprises an arc cutout 228 such that the arc cutout 228 exactly matches the dimensions of the outer circumference of the dispensers.

The top lid 224 fits into the top portion of the holder body 202 such that the top lid 224 rotates freely around the top portion of the holder body 202 with the first dispenser 204, second dispenser 206, third dispenser 208, fourth dispenser 210 and fifth dispenser 212 inserted inside.

Furthermore, when rotated, the top lid 224 stops at one or more predetermined positions along the rotation path. The one or more predetermined positions are such that the arc cutout 228 aligns directly above each of the two or more dispensers in the two or more slots. Those with ordinary skill in the art will realise that the mechanism described in the current embodiment enables a user to rotate the top lid 224 and position the arc cutout 228 directly above a desired dispenser. The user can then push the desired dispenser through the arc cutout 228 to dispense a desired base colour.

In accordance with another embodiment of the present invention, the top lid 224 is without the arc cutout 228 and is used only to secure the five dispenser in place. During usage, a user is required to remove the top lid 224 and press a desired dispenser individually.

In yet another embodiment of the present invention, the top lid 224 is without the arc cutout 228 and has a push-click mechanism. The top lid 224 rotates freely about the holder body 202 and stops at each dispenser. The user can rotate the top lid 224 to a desired dispenser and push-click the top lid 224 to dispense a desired base colour.

In accordance with various embodiment of the present invention, the container 226, when attached to the holder body 202, collects the dispensed base colour.

The user dispenses the two or more base colours from the two or more dispensers in predetermined ratios (or number of pushes) to create a plurality of customised colours or textures of liquid lipstick. Those skilled in the art will appreciate that with each push of a dispenser, approximately same amount of base colour is dispensed each time. Consequently, a colour recipe chart 600 (described in detail in FIG. 6 below) can be formulated and provided to the user which has 'recipes' for a plurality of customised colours, wherein a number of pushes of the base colours such as red, yellow, blue, white and black can be listed to create a particular custom colour.

Once the user dispenses the desired amount of the two or more base colours into the container 226, they can detach the container 226 from the holder body 202 and mix the dispensed base colours with a mixing wand and create the desired custom colour.

In an embodiment of the present invention, the container 226 comes with a lid so that the created custom colour can be stored for later use.

Figure 3:
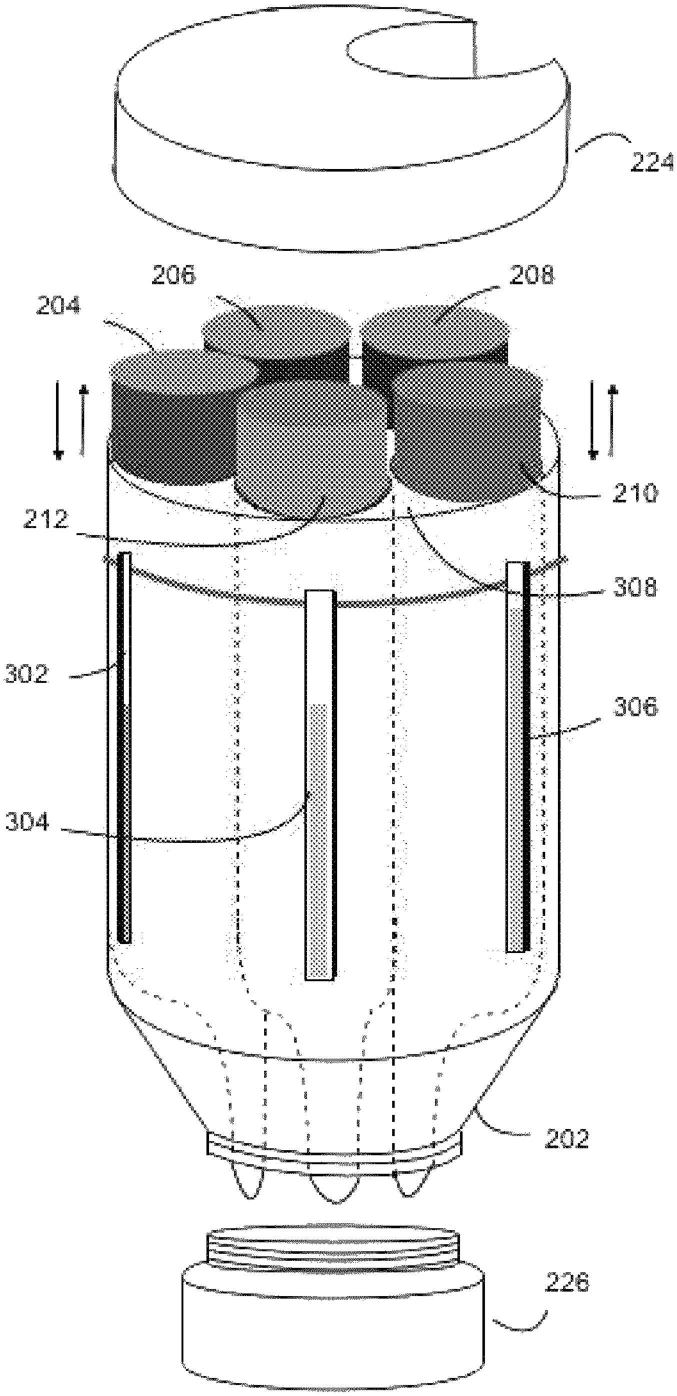
FIG. 3 illustrates the handheld device 200 with five dispensers inserted inside.

FIG. 3 illustrates the handheld device 200 with the five dispensers, viz. the first dispenser 204, the second dispenser 206, the third dispenser 208, the fourth dispenser 210 and the fifth dispenser 212 inserted inside the five slots, viz. the first slot 214, the second slot 216, the third slot 218, the fourth slot 220 and the fifth slot 222 respectively.

In accordance with an embodiment of the present invention, the handheld device 200 has colour marking next to each slot to enable a user to insert the correct colour dispensers in their respective slots. For instance, a dispenser with white base colour can be inserted inside a slot with white marking, a dispenser with red base colour can be inserted inside a slot with red marking, and so on and so forth.

It will however be appreciated by one skilled in the art that the markings are only a guide for a user to afford a better user experience and does not have any functional impact on the handheld device 200.

Furthermore, in accordance with an embodiment of the present invention, the dispensers are transparent such that a user is able to see the base colour and its level. In accordance with this embodiment, the holder body 202 comprises two or more indicator cutouts for the two or more slots, such that the level of the base colours can be seen through the two or more indicator cutouts when the two or more dispensers are inserted in the two or more slots.

For instance, as shown in FIG. 3, a user is able to see the colour and level of the base colour in the first dispenser 204 through a first indicator cutout 302 in the first slot 214. Similarly, the user is able to see the colour and level of the base colour in the fifth dispenser 212 through a fifth indicator cutout 304 in the fifth slot 222 and the colour and level of the base colour in the fourth dispenser 210 through a fourth indicator cutout 306 in the fourth slot 220. Indicator cutouts for the second slot 216 and the third slot 218 are not shown in FIG. 3 but are understood to be present.

When the level of base colour in any of the two or more dispensers reaches below a predetermined mark, the user can replace that dispenser with a new dispenser.

In accordance with an embodiment of the present invention, the two or more dispensers, when inserted completely into the two or more slots, have a predetermined length of tail end that remains outside the slots. The predetermined length of tail end corresponds to the distance of full push of a dispenser, such that when a user presses an inserted dispenser, they can push the dispenser to its full capacity easily without hitting a top surface 308 of the holder body 202.

Those skilled in the art will appreciate that other embodiments with different arrangement of insertion of a dispenser and dispension of a base colours are envisioned and are within the scope of the present invention.

Figure 4:
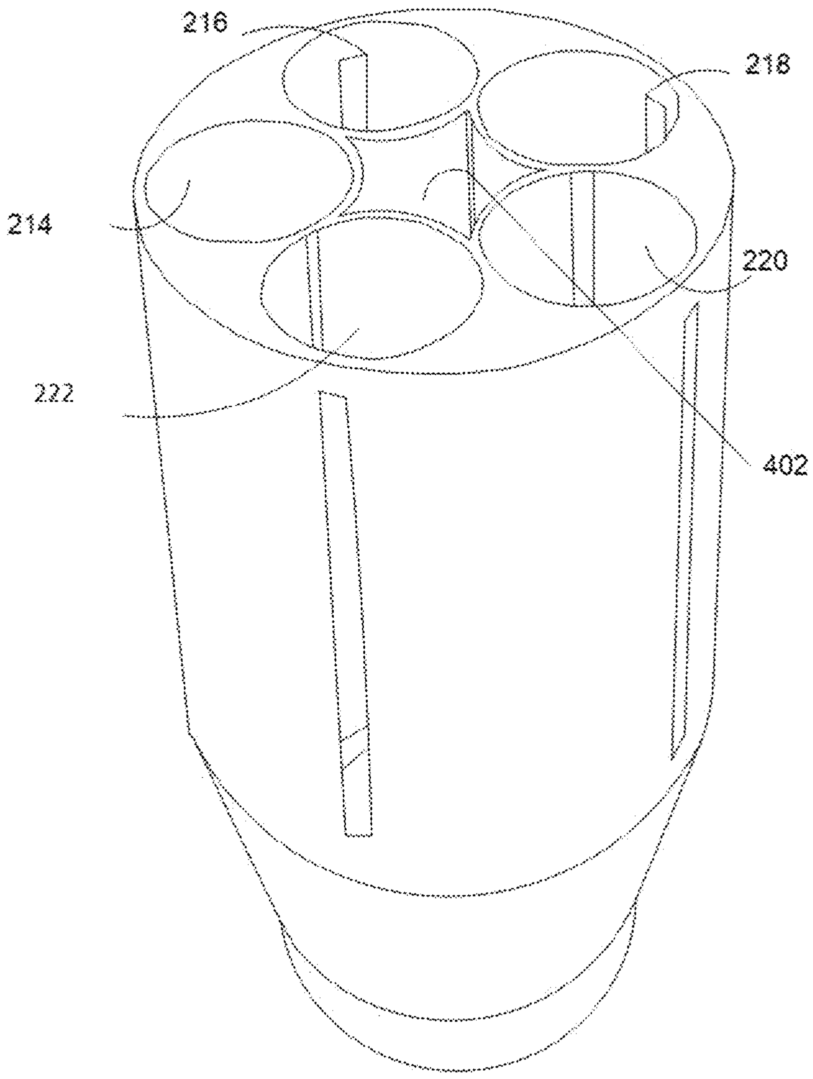
FIG. 4 illustrates a perspective view of a holder body 202 of the handheld device 200 in accordance with an embodiment of the present invention.

FIG. 4 illustrates a perspective view of the holder body 202 in accordance with an embodiment of the present invention, wherein the two or more dispensers are not inserted into the first slot 214, the second slot 216, the third slot 218, the fourth slot 220 and the fifth slot 222.

Those skilled in the art will realise that the holder body 202 has a center space 402. The center space 402 can be a cavity in accordance with an embodiment of the present invention in order to reduce the overall weight of the handheld device 200. In addition, the center space 402 can be used to hold a colour recipe chart described in FIG. 6 below.

Those skilled in the art will appreciate that various shapes of the handheld device 200 can be envisioned, as long as the basic functionality of the handheld device 200 remains the same.

Figure 5:
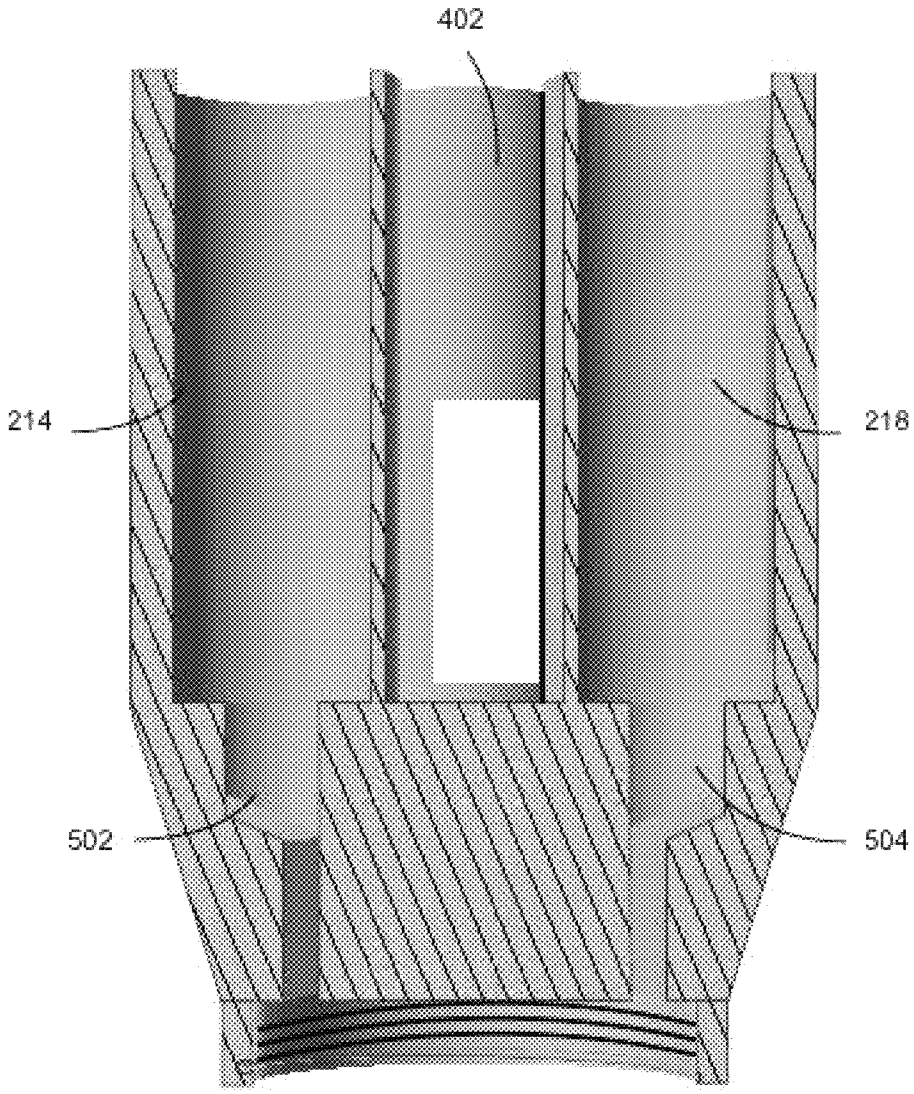
FIG. 5 is a vertical cross sectional view of the holder body 202 of the handheld device 200 in accordance with an embodiment of the present invention.

FIG. 5 is a vertical cross sectional view of the holder body 202 in accordance with an embodiment of the present invention, wherein dispensers are not inserted into the first slot 214 and the third slot 218.

In accordance with this embodiment, the first slot 214 and the third slot 218 have a groove 502 and a groove 504 respectively, such that the first dispenser 204 and the third dispenser 208 fit perfectly into the first slot 214 and the third slot 218. A mechanism for holding the two or more dispensers in place can be built inside of the two or more slots so that when the handheld device 200 is flipped upside down without the top lid 224, the two or more dispensers don't fall off.

FIG. 6 depicts a colour recipe chart 600 in accordance with an embodiment of the present invention.

The colour recipe chart 600 comprises of two or more columns corresponding to the two or more base colours in the two or more dispensers. For example, in the current embodiment, the colour recipe chart 600 comprises a first column 601, a second column 602, a third column 603, a fourth column 604 and a fifth column 605 corresponding to a base colour in first dispenser 204, a base colour in the second dispenser 206, a base colour in the third dispenser 208, a base colour in the fourth dispenser 210 and a base colour in the fifth dispenser 212 respectively. One or more rows 606 of the colour recipe chart 600 correspond to one or more custom colours that can be created with different permutations and combinations of the two or more base colours depicted in the two or more columns.

For instance, in accordance with an embodiment of the present invention, the first column 601 corresponds to the colour red, the column 601 corresponds to the colour blue, the third column 603 corresponds to the colour yellow, the fourth column 604 corresponds to the colour black and the fifth column 605 corresponds to the colour white.

The one or more rows 606 correspond to the various custom colours that can be obtained when the colours red, blue, yellow, black and white are mixed in various ratios. The numbers corresponding to the ratios are written in the respective cells.

It will be obvious to those skilled in the art that presentation of the colour recipe chart 600 may vary and may have recipes for any number of colours, and all such embodiments are within the scope of the present invention.

In an embodiment of the present invention, the colour recipe chart 600 is stored in the center space 402 inside the holder body 202.

In another embodiment of the present invention, the colour recipe chart 600 is printed on the handheld device 200 itself.

In another embodiment of the present invention, the colour recipe chart 600 is attached to the handheld device 200 with a roll out mechanism.

In yet another embodiment of the present invention, the colour recipe chart 600 is available to the user via an App on their smart devices.

Figure 7:
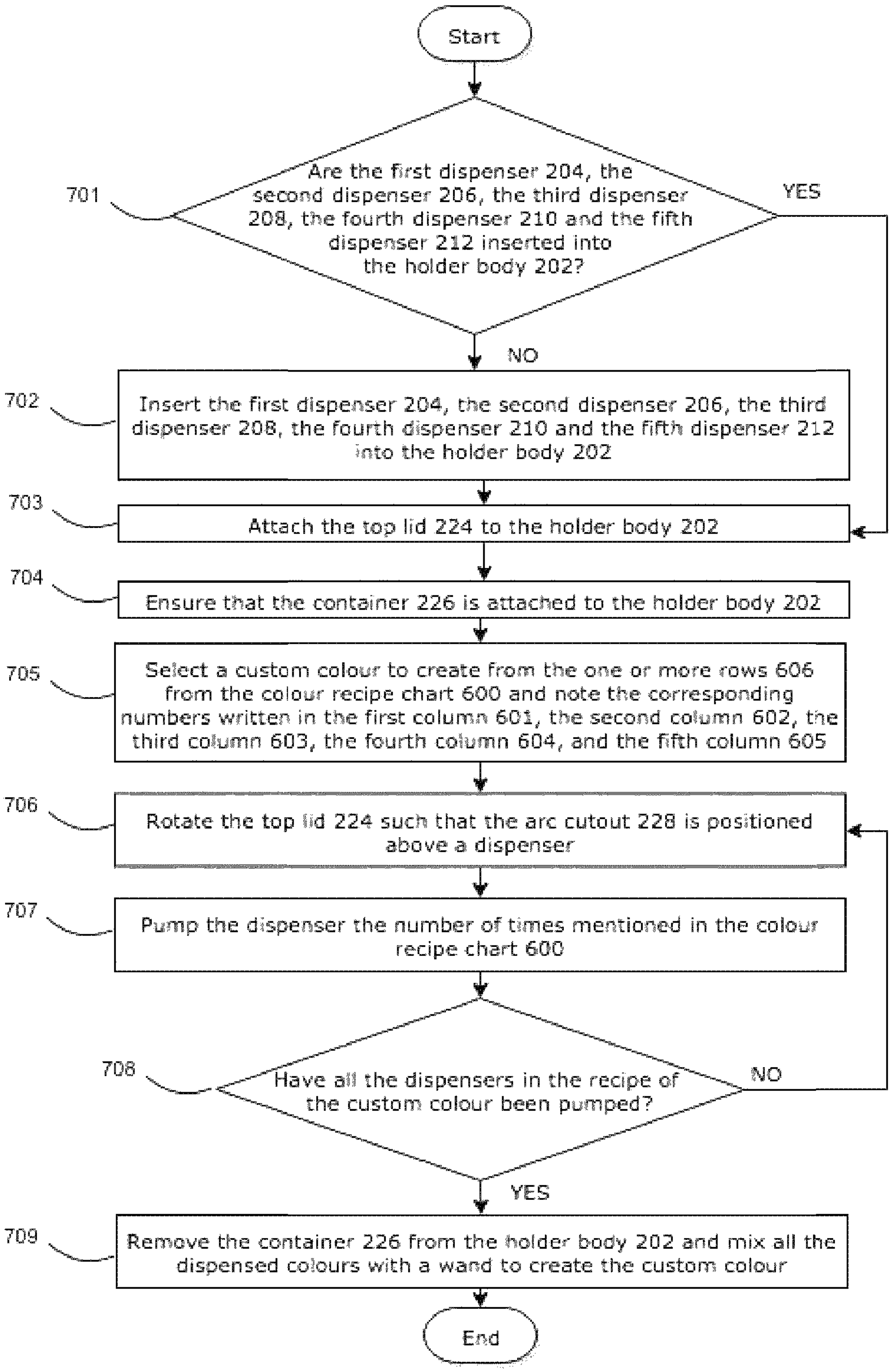
FIG. 7 describes a flowchart of a method of creating a plurality of customised colours using the handheld device 200 in accordance with an embodiment of the present invention.

FIG. 7 describes a flowchart of a method for creating a custom colour using the handheld device 200 in accordance with an embodiment of the present invention.

At step 701, a user checks if all the five dispensers, viz. the first dispenser 204, the second dispenser 206, the third dispenser 208, the fourth dispenser 210 and the fifth dispenser 212 are inserted properly inside the slots in the holder body 202. If not, then the user inserts the first dispenser 204, the second dispenser 206, the third dispenser 208, the fourth dispenser 210 and the fifth dispenser 212 into their respective slots, viz. the first slot 214, the second slot 216, the third slot 218, the fourth slot 220, the fifth slot 222, at step 702.

Once the dispensers are inserted into the holder body 202, the user attaches the top lid 224 to the holder body 202, at step 703. Those skilled in the art will appreciate that other embodiments wherein the top lid 224 is not required to be attached to the handheld device for usage are envisioned and are within the scope of the present invention.

At step 704, the user ensures that the container 226 is attached to the holder body 202. The container 226 needs to be clean, without any other colour liquid lipstick, in order to get accurate results.

At step 705, the user refers to the colour recipe chart 600 and selects a custom colour that they wish to create from the one or more rows 606. The columns corresponding to the custom colour comprises the number of pumps of each of the two or more base colours required to create the custom colour.

At step 706, the user rotates the top lid 224 so that the arc cutout 228 is positioned above one of the dispensers.

The user then pumps the dispenser the number of times mentioned in the recipe for the custom colour, at step 707.

At step 708, the user repeats step 706 and step 707 for each dispenser represented in the recipe of the custom colour till all the dispensers mentioned in the recipe of the custom colour are pumped out into the container 226.

At step 709, the user removes the container 226 from the holder body 202 and mixes the dispenses liquid lipsticks with a wand to create the custom colour.

Those skilled in the art will realise that the colour recipe chart 600 can comprise the ratios of the base colours in the columns to be mixed to create any custom colour. A user can create a larger quantity of custom colour by pumping the dispensers by multiples of the ratios mentioned in the colour recipe chart.

In an embodiment of the present invention, the container 226 comes with a cover so that the custom colour created can be stored for future use.

In another embodiment of the present invention, the custom colour is created on a pan to be used immediately.

Those with ordinary skill in the art may appreciate that the handheld device 200 can be designed for any number of dispensers. For instance, the handheld device 200 can be built for six dispensers, wherein five dispensers dispense the five primary colours mentioned in the above embodiment, and the sixth dispenser dispenses a mattifier liquid to transform the final mixture to a 'matte' effect liquid lipstick.

Moreover, in an embodiment of the present invention, the liquid lipstick colours in the dispensers may follow the CMYK (Cyan, Magenta, Yellow and Key) system for colour creation. In yet another embodiment of the present invention, the colours in the dispensers are RGB (Red, Green and Blue) instead of the RYB (Red, Yellow and Blue) as described in the above preferred embodiment.

In an embodiment of the present invention, the holder body 202 is made of a composite material such as Fiber-Reinforced Plastic (FRP) to insulate the liquid lipstick inside the dispensers from drastic temperature changes.

In an alternate embodiment of the present invention, the handheld device 200 comes with an insulating jacket to support optimal performance of the dispenser mechanism.

It will be apparent to those skilled in the art will that while the present invention has been described to be used for liquid lipsticks, the handheld device 200 and the method can be used for various other products such as eyeshadows, foundations, skin care creams etc. and even for non-cosmetic products such as artists colours etc. with a few simple modifications.

While various embodiments of the present invention have been described above, it should be understood that they have been presented by way of example only, and not as a limitation. Numerous changes to the disclosed embodiments can be made in accordance with the disclosure herein without departing from the spirit or scope of the invention. Thus, the breadth and scope of the present invention should not be limited by any of the above described embodiments.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

The terminology used herein is for the purpose of describing particular embodiments only and is not intended to be limiting of the invention. As used herein, the singular forms "a," "an," and "the" are intended to include the plural forms as well, unless the context clearly indicates otherwise. Furthermore, to the extent that the terms "consists", "consisting", "including," "includes," "having," "has," "with," or variants thereof are used in the detailed description, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure allows the reader to quickly ascertain the nature of the technical disclosure. It is submitted with the understanding that it will not be used to interpret or limit the scope or meaning of the present invention.

What is claimed is:

1. A handheld device for creating a plurality of customised colors from two or more base colors, the handheld device comprising:

two or more dispensers, each of the two or more dispensers configured to store one of the two or more base colors, the two or more dispensers comprising a dispensing mechanism, wherein a dispensing action enables the dispensing mechanism to dispense a controlled amount of base color;

a holder body, the holder body comprising two or more slots for housing the two or more dispensers;

a removable container connected to the holder body, the removable container receiving the two or more base colors dispensed from the two or more dispensers, wherein mixing the two or more base colors received in the removable container results in the creation of one of the plurality of customised colors; and a top lid, wherein the top lid connects to a top portion of the holder body so as to enclose the two or more dispensers within the holder body, wherein the top lid comprises an arc cutout for accessing the dispensing mechanism of each of the two or more dispensers, wherein the top lid rotates around the top portion of the holder body, such that the arc cutout stops at two or more predetermined positions, the two or more predetermined positions configured to align with the dispensing mechanism of each of the two or more dispensers.

2. The handheld device in accordance with claim 1, wherein each of the two or more slots extend along the length of the holder body.

3. The handheld device in accordance with claim 1, wherein the dispensing mechanism is a mechanical pump, and the dispensing action is pumping.

4. The handheld device in accordance with claim 1, wherein the plurality of customised colors are one or more of lip colors, eye shadows, blusher, and foundation.

5. The handheld device in accordance with claim 1, wherein the two or more base colors are two or more of red color, yellow color, blue color, green color, black color, white color, cyan color, and magenta color.

6. The handheld device in accordance with claim 1 further comprises a color recipe chart for creating the plurality of customised colors, wherein the color recipe chart depicts a number of dispensing actions to be taken corresponding to each of the two or more base colors for creating the one of the plurality of customised colors.

7. The handheld device in accordance with claim 6 further comprises a slot in the holder body for storing the color recipe chart.

8. The handheld device in accordance with claim 6, wherein the color recipe chart is printed on the handheld device.

9. The handheld device in accordance with claim 6, wherein the color recipe chart is accessed electronically on one or more of an application on a mobile device and on a website.

10. The handheld device in accordance with claim 1, wherein the two or more base colors are of a liquid form, the two or more dispensers configured for dispensing the liquid form.

11. The handheld device in accordance with claim 10, wherein the two or more dispensers are airless pump bottles.

12. The handheld device in accordance with claim 1, wherein the two or more base colors are one or more of a powder form and a granule form.

13. The handheld device in accordance with claim 1, wherein one of the two or more dispensers comprises a transforming agent, the transforming agent comprising of one or more of a mattifying agent, a moisturizing agent, a shine agent, and a glitter agent.

14. The handheld device in accordance with claim 1, wherein the two or more dispensers comprise a transparent body, such that the two or more base colors can be seen through the transparent body.

15. The handheld device in accordance with claim 14, further comprises two or more indicator cutouts, wherein the two or more indicator cutouts correspond to each of the two or more slots, such that the two or more dispensers can be seen through the two or more indicator cutouts, thereby enabling observation of the two or more base colors for usage levels and colors.

16. A handheld device for creating a plurality of customised colors, the handheld device comprising:

two or more base colors;

a dispensing mechanism configured to dispense each of the two or more base colors in controlled amounts;

a removable container for receiving the two or more base colors dispensed by the dispensing mechanism, wherein mixing the two or more base colors received in the removable container results in creation of one of the plurality of customised colors;

a holder body for housing the dispensing mechanism; and a top lid and, wherein the top lid connects to a top portion of the holder body so as to enclose the dispensing mechanism within the holder body, wherein the top lid comprises an arc cutout for accessing the dispensing mechanism, wherein the top lid rotates around the top portion of the holder body, such that the arc cutout stops at two or more predetermined positions, the two or more predetermined positions configured to align with the dispensing mechanism.

17. A method for creating a plurality of customised colors from two or more base colors, the method comprising:

providing a handheld device for dispensing the two or more base colors, the handheld device comprising:

two or more dispensers, each of the two or more dispensers storing one of the two or more base colors, the two or more dispensers comprising a dispensing mechanism configured to dispense a controlled amount of base color with a dispensing action;

a holder body for housing the two or more dispensers;

a removable container for receiving the two or more base colors dispensed from the two or more dispensers; and a top lid, wherein the top lid connects to a top portion of the holder body so as to enclose the two or more dispensers within the holder body, wherein the top lid comprises an arc cutout for accessing the dispensing mechanism of each of the two or more dispensers, wherein the top lid rotates around the top portion of the holder body, such that the arc cutout stops at two or more predetermined positions, the two or more predetermined positions configured to align with the dispensing mechanism of each of the two or more dispensers, providing a color recipe chart to create the plurality of customised colors, wherein the color recipe chart depicts a number of dispensing actions to be performed on each of the two or more base colors to create each of the plurality of customised colors;

selecting a custom color to create from the color recipe chart, wherein the custom color is one of the plurality of customised colors;

performing the number of dispensing actions on the two or more base colors, wherein the number of dispensing actions corresponds to a recipe of the custom color in the color recipe chart;

disconnecting the removable container from the handheld device, the removable container having received the two or more base colors from the two or more dispensers; and mixing the two or more base colors received in the removable container to create the custom color.

* * * * *